United States Patent
Tao et al.

(10) Patent No.: US 12,524,943 B2
(45) Date of Patent: Jan. 13, 2026

(54) SYSTEM FOR MOTION RETARGETING WITH OBJECT INTERACTION

(71) Applicant: Electronic Arts Inc., Redwood City, CA (US)

(72) Inventors: Tianxin Tao, Richmond (CA); Jingwen Liang, Santa Clara, CA (US); Harold Henry Chaput, Castro Valley, CA (US)

(73) Assignee: Electronic Arts Inc.

( * ) Notice: Subject to any disclaimer, the term of this patent is extended or adjusted under 35 U.S.C. 154(b) by 286 days.

(21) Appl. No.: 18/192,102

(22) Filed: Mar. 29, 2023

(65) Prior Publication Data

US 2024/0331248 A1  Oct. 3, 2024

(51) Int. Cl.
*G06T 13/40* (2011.01)
(52) U.S. Cl.
CPC ................................ *G06T 13/40* (2013.01)
(58) Field of Classification Search
None
See application file for complete search history.

(56) References Cited

U.S. PATENT DOCUMENTS

| | | | | |
|---|---|---|---|---|
| 10,275,922 | B2 * | 4/2019 | Pan | G06T 13/40 |
| 11,562,523 | B1 * | 1/2023 | Starke | G06V 40/23 |
| 2008/0024503 | A1 * | 1/2008 | Smith | G06T 13/40 |
| | | | | 345/473 |
| 2015/0145859 | A1 * | 5/2015 | Corazza | G06T 13/40 |
| | | | | 345/419 |
| 2019/0066351 | A1 * | 2/2019 | Noh | G06T 19/20 |
| 2021/0158590 | A1 * | 5/2021 | Bradley | G06T 17/20 |
| 2021/0209788 | A1 * | 7/2021 | Kim | G06T 7/73 |
| 2021/0343059 | A1 * | 11/2021 | Villegas | G06N 3/08 |
| 2022/0020199 | A1 * | 1/2022 | Villegas | G06N 3/084 |
| 2022/0134552 | A1 * | 5/2022 | Bächer | B25J 9/1671 |
| | | | | 700/261 |
| 2023/0037339 | A1 * | 2/2023 | Villegas | G06N 3/044 |
| 2023/0186544 | A1 * | 6/2023 | Saito | G06T 13/80 |
| | | | | 345/473 |
| 2023/0267668 | A1 * | 8/2023 | Starke | G06T 13/40 |
| 2024/0070949 | A1 * | 2/2024 | Atherton | G06T 13/40 |

OTHER PUBLICATIONS

Kim et al., "Retargeting Human-Object Interaction to Virtual Avatars" (Year: 2016).*

* cited by examiner

*Primary Examiner* — Hilina K Demeter
(74) *Attorney, Agent, or Firm* — Lee & Hayes, P.C.

(57) ABSTRACT

A system may perform animation retargeting that may allow an existing animation to be repurposed for a different skeleton and/or a different environment geometry from that associated with the existing animation. The system may input, to a machine learning (ML) retargeting model, an input animation, a target skeleton and environment geometry data of an environment for a predicted animation, wherein the ML retargeting model is configured to generate the predicted animation based on the input animation, the target skeleton and the environment geometry data of the environment for the predicted animation and receive, from the ML retargeting model, the predicted animation based on the input animation, the target skeleton and the environment geometry data of the environment for the predicted animation.

17 Claims, 6 Drawing Sheets

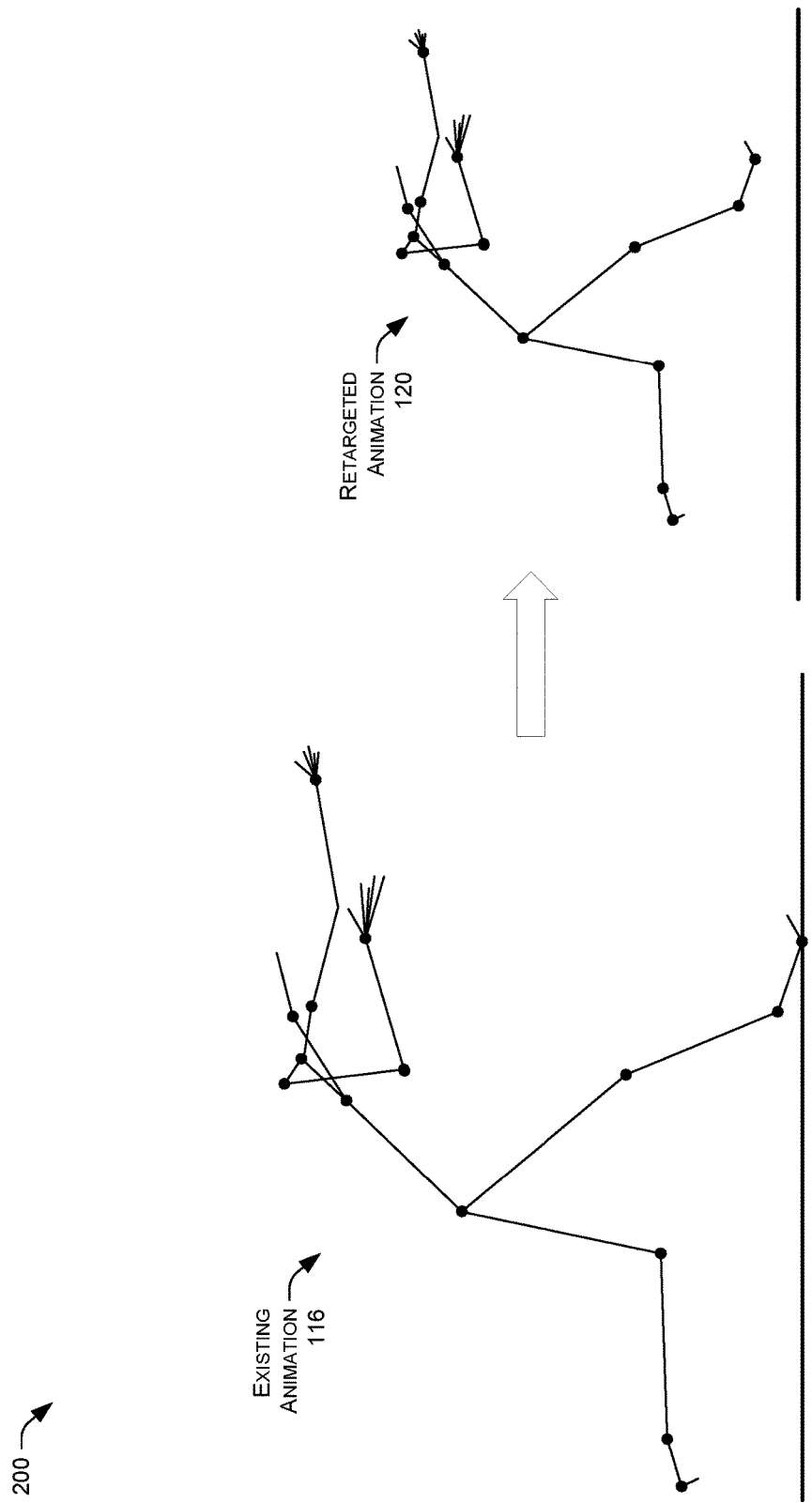

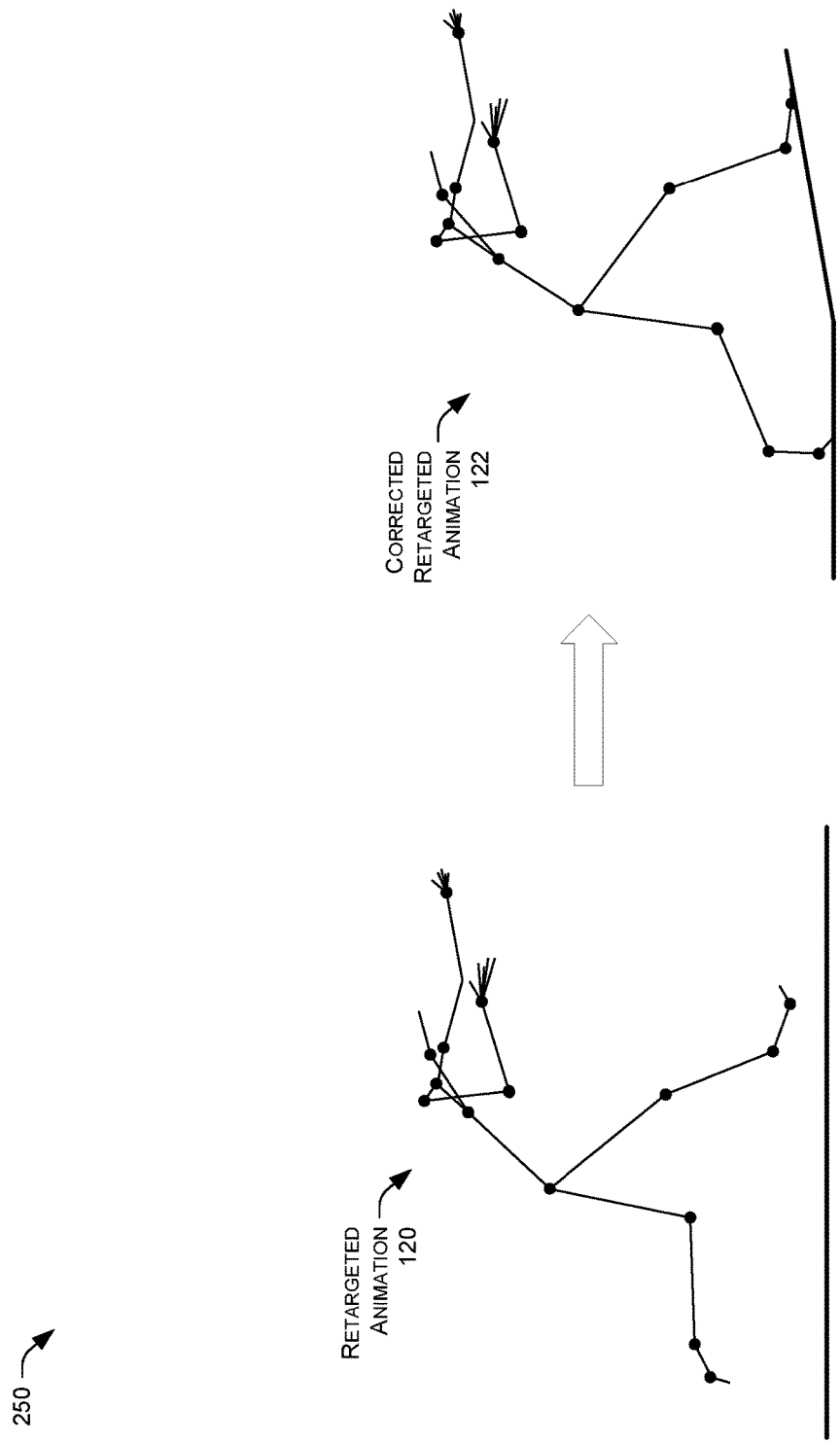

SYSTEM FOR MOTION RETARGETING WITH OBJECT INTERACTION

BACKGROUND

In rendering, a character (used herein to also include other articulated objects) may be animated using skeletal animation. Such animation may include motion data that is applied to a skeleton of a model. With the rise of custom characters in games, producing animations for new or custom characters or models may be time consuming and expensive.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 2A illustrates an example view of an animation being generated by retargeting an existing animation, in accordance with example embodiments of the disclosure.

FIG. 2B illustrates an example view of an example corrected retargeted animation being generated based on a retargeted animation and an environment geometry, in accordance with example embodiments of the disclosure.

DETAILED DESCRIPTION

Figure 1:
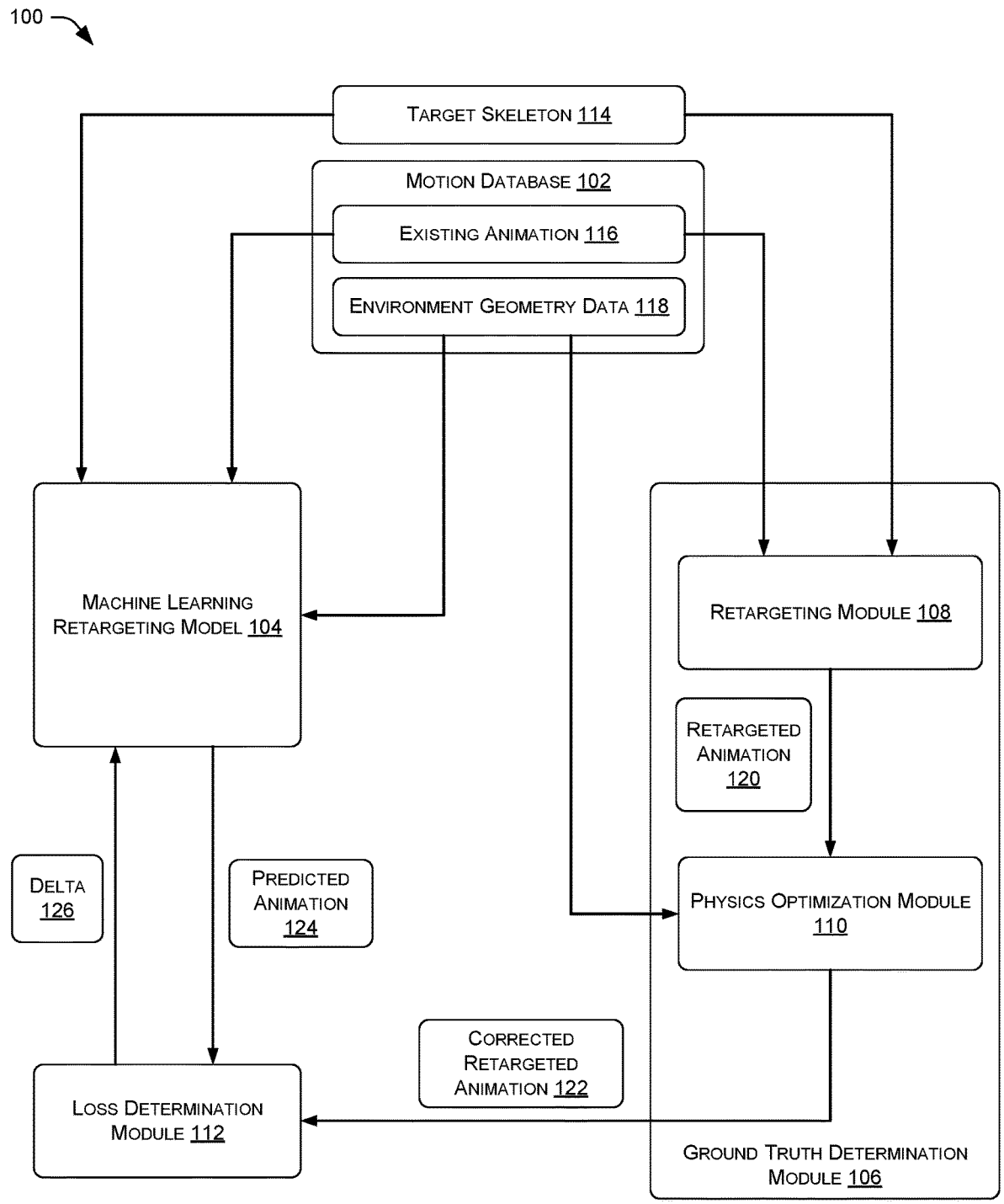
FIG. 1 illustrates a schematic diagram of an example system that may train and/or operate a retargeting model that may perform motion retargeting to repurpose an existing animation to a different skeleton and/or environment geometry, in accordance with example embodiments of the disclosure.

Example embodiments of this disclosure describe methods, apparatuses, computer-readable media, and system(s) that may provide for animation retargeting that may allow an existing animation to be repurposed for a different skeleton and/or a different environment geometry from that associated with the existing animation. More particularly, systems and methods herein may operate to train and/or operate a retargeting model that may perform motion retargeting to repurpose an existing animation to a different skeleton and/or environment geometry, which may reduce the need to create a new animation for the different skeleton and/or environment geometry.

Skeletal animation may represent a character (or other articulated object) in two parts: a surface representation that may be used to draw the character (called the mesh or skin) and a hierarchical set of interconnected parts (called bones, and collectively forming the skeleton or rig), a virtual armature that may be used to animate (pose and keyframe) the mesh. While this technique may be used to animate humans and other organic figures, the technique can also be used to control the deformation of any other object-such as a door, a spoon, a building, or a galaxy.

The bones of the skeleton may not correspond to any real-world anatomical feature. Each bone may have a three-dimensional transformation from the default pose (which includes its position, scale and orientation), and an optional parent bone. As the character is animated, the bones may change their transformation over time, under the influence of some animation controller. A rig may be generally composed of both forward kinematics and inverse kinematics parts that may interact with each other. Skeletal animation may refer to the forward kinematics part of the rig, where a complete set of bone configurations identifies a unique pose.

Systems and techniques herein may utilize retargeted animations that have been corrected or augmented with physics-based motion optimization as training or ground truth data to train the retargeting model that may perform motion retargeting. For example, animations may involve interaction with the environment, such as sitting on chairs, climbing walls and jumping on boxes. Retargeting without regard to environment geometry may cause the retargeted animation to include motions that penetrate into the objects or cause sliding artifacts on contact points. Some examples according to this disclosure may perform retargeting of an existing animation to a target skeleton to generate a retargeted animation for the target skeleton. Physics-based motion optimization may then be performed for the retargeted animation based on the environment geometry to generate a corrected retargeted animation for the target skeleton. The system may also input the existing animation, the target skeleton and the environment geometry to the retargeting model. The retargeting model may output a predicted animation for the target skeleton based on the input. An error or delta may be determined between the predicted animation for the target skeleton and the corrected retargeted animation for the target skeleton. Then, the retargeting model may be updated, for example, by backpropagation of the error.

Certain implementations and embodiments of the disclosure will now be described more fully below with reference to the accompanying figures, in which various aspects are shown. However, the various aspects may be implemented in many different forms and should not be construed as limited to the implementations set forth herein. For example, while discussed primarily herein in the context of a human model, other examples may relate to other entities or object (e.g., an animal or machine model) and/or may relate to another portion of the model or the entire model. Moreover, embodiments may vary and are not limited in the computing devices or processors that may perform operations to train and/or operate a retargeting model that may perform motion retargeting to repurpose an existing animation to a different skeleton and/or different environment geometry. It will be appreciated that the disclosure encompasses other variations of the embodiments, as described herein. Like numbers refer to like elements throughout.

FIG. 1 illustrates a schematic diagram of an example system 100 that may train and/or operate a retargeting model that may perform motion retargeting to repurpose an existing animation to a different skeleton and/or environment geometry, in accordance with example embodiments of the disclosure. The system 100 may include a motion database 102, a machine learning retargeting model 104, a ground truth determination module 106, and a loss determination module 112. In addition, the ground truth determination module 106 may include a retargeting module 108 and a physics optimization module 110.

In operation, the system 100 may receive input or otherwise determine a target skeleton 114 for which an existing animation 116 is to be retargeted for a particular environment geometry. An existing animation 116 and environment geometry data 118 for an environment geometry may be loaded from the motion database 102. The environment geometry may be an environment geometry corresponding to the existing animation 116 or a different environment geometry.

In training, a target skeleton 114 and the existing animation 116 may be input to the machine learning retargeting model 104 and the retargeting module 108 of the ground truth determination module 106. The environment geometry data 118 may be input to the machine learning retargeting model 104 and the physics optimization module 110 of the ground truth determination module 106.

The retargeting module 108 of the ground truth determination module 106 may operate to perform retargeting of the existing animation 116 to the target skeleton 114 to generate a retargeted animation 120 for the target skeleton 114. In view of this disclosure, one of ordinary skill in the art would understand various retargeting algorithms that may be utilized to perform retargeting from an existing animation to a target skeleton. Generally, the retargeting module 108 may adjust motions of the source skeleton in the existing animation 116 to cause the target skeleton 114 to move through the same motions in the retargeted animation 120. In some examples, the retargeting module 108 may determine the retargeted animation 120 such that the target skeleton 114 does not lose its proportions or become unnecessarily deformed when animated to perform the motions of the existing animation 116 despite being a differently shaped character from the source skeleton. For example, where the proportions of the bones of the target skeleton 114 differ from the proportions of the bones of the source skeleton of the existing animation 116, the retargeting module 108 may scale the translations of bones in the retargeted animation 120 to the proportions of the bones of target skeleton 114 (e.g., based on the ratio between the bone length of the target skeleton 114 and the source skeleton for which the existing animation 116 was authored for). Additional operations may be performed to retarget the existing animations such as mapping portions of the target skeleton 114 to portions of the source skeleton when the target skeleton 114 and the source skeleton have different anatomies or different bones. As mentioned above, the retargeted animation 120 may include artifacts with regard to the environment geometry, such as the character penetrating into objects in the environment, not contacting the floor or particular objects (e.g., not contacting a lever), or cause sliding on contact points.

FIG. 2A illustrates an example view 200 of an animation being generated by retargeting an existing animation, in accordance with example embodiments of the disclosure. In particular, the view 200 illustrates an example existing animation 116 related to a source skeleton being retargeted to a target skeleton 114 as an example retargeted animation 120. In the illustrated example view, the retargeted animation 120 is generated for a target skeleton 114 that is smaller than a source skeleton of the existing animation 116. Such disparity in skeleton size may result in the retargeted animation including artifacts such as not contacting the environment geometry in the same way as the source skeleton in the existing animation 116. Example view 200 is merely an example of a possible retargeting result. Other retargeting algorithms may produce different retargeting results, such as retargeting results that maintain contact with the ground of the environment.

Returning to FIG. 1, the physics optimization module 110 of the ground truth determination module 106 may receive the retargeted animation 120 and the environment geometry data 118. The physics optimization module 110 may generate a corrected retargeted animation 122 for the target skeleton by performing physics-based motion optimization of the retargeted animation 120 based on the environment geometry data 118. In view of this disclosure, one of ordinary skill in the art would understand various physics-based motion optimization algorithms that may be utilized to perform physics-based motion optimization for the retargeted animation 120 and the environment geometry data 118.

In some examples, the physics-based motion optimization may utilize the retargeted animation 120 as an initial estimated motion to be optimized. In particular, the physics-based motion optimization algorithm may generate a number of candidate action sequences which may represent variations on the retargeted animation 120. For example, the candidate action sequences may include joint torques for the joints of the target skeleton at each time step. When the joint torques of the candidate action sequences are executed in a physics-based simulator, variations on the retargeted animation 120 may be generated according to the physics rule set in the simulator. The physics-based motion optimization algorithm may evaluate the candidate action sequences using forward physics-based simulation including determining respective costs for the action sequence based on a cost function. The physics optimization module 110 may then select the candidate action sequence that minimizes the cost function and the animation output by the physics-based simulation for the selected candidate action sequence may be used as the corrected retargeted animation 122 for the target skeleton.

FIG. 2B illustrates an example view 250 of an example corrected retargeted animation being generated based on a retargeted animation and an environment geometry, in accordance with example embodiments of the disclosure. In particular, the view 250 illustrates an example retargeted animation 120 being optimized using physics-based motion optimization based on the retargeted animation 120 and environment geometry data 118 to generate a corrected retargeted animation 122 for the target skeleton.

In the illustrated example view, the corrected retargeted animation 122 is being generated based on a retargeted animation 120 which was in turn generated for an existing animation whose source skeleton was larger than and had somewhat different proportions from the target skeleton. In the illustrated example, this resulted in the target skeleton in the retargeted animation being retargeted such that the target skeleton does not contact the ground geometry. Further, in the illustrated example, the environment geometry data may define environment geometry including an incline rather than level ground.

As illustrated, the physics-based simulations of the physics-based motion optimization may generate candidate action sequences for the corrected retargeted animation 122 in which the target skeleton's feet are in contact with the ground. Further, the physics-based motion optimization may optimize the movement of the target skeleton based on the physical interactions of the target skeleton with the environment geometry during the physics-based motion optimization. For example, in the selected candidate action sequence of the corrected retargeted animation 122, the target skeleton's legs are positioned optimally for traversing the incline in the environment geometry and the target skeleton's upper body posture has shifted to maintain balance while going up the incline. Example view 250 is merely an example of a possible physics-based motion optimization result. Other physics-based motion optimization algorithms may produce different results.

Returning to FIG. 1, the machine learning retargeting model 104 may utilize the target skeleton 114, the existing animation 116 and the environment geometry data 118 as input to a machine learning model to generate a predicted animation 124 for the target skeleton 114. In some instances, the machine learning retargeting model 104 may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, Transformer, Denoising Diffusion Probabilistic Models (DDPM) and the like.

The loss determination module 112 may receive the corrected retargeted animation 122 from the ground truth determination module 106 and the predicted animation 124 from the machine learning retargeting model 104. The loss determination module 112 may determine an error or delta 126 between the predicted animation 124 and the corrected retargeted animation 122. The delta 126 may be output to the machine learning retargeting model 104. More particularly, the machine learning retargeting model 104 may be updated or trained, for example, by backpropagation of the delta 126. However, embodiments are not so limited and one of ordinary skill in the art would understand that other training techniques may be utilized in view of this disclosure.

Following training, the machine learning retargeting model 104 may operate in a similar manner during normal operation. For example, the machine learning retargeting model 104 may receive an existing animation, a target skeleton and environment geometry data as inputs and, based on those inputs, output a predicted animation. The predicted animation may be similar to a corrected retargeted animation that the ground truth determination module 106 would generate based on the same inputs. Further, in normal operation of the system of FIG. 1, the operations of the ground truth determination module 106 may be suspended.

Moreover, during normal operations, the predicted animation 124 may be stored in the motion database 102 for use as an animation for the target skeleton 114. In addition or alternatively, in some examples, the normal operation of the trained machine learning retargeting model 104 may be utilized to retarget existing animations to target skeletons in real time operations. For example, the machine learning retargeting model 104 may be utilized in real time during game play of a video game to generate a predicted animation of a custom character model by retargeting an existing animation to the skeleton of the custom character model.

Figure 3:
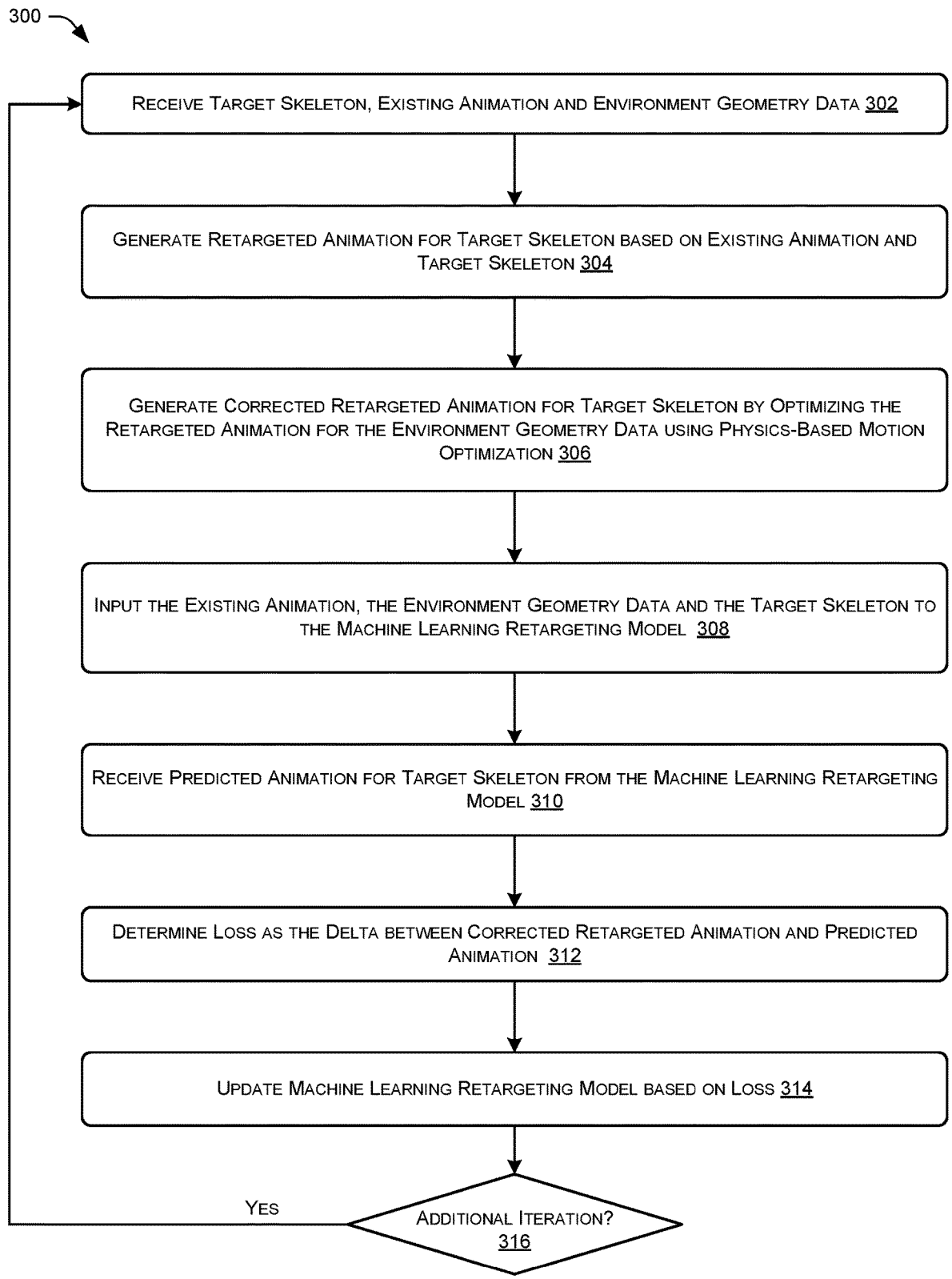
FIG. 3 illustrates a flow diagram of an example method that may be performed to train a retargeting model that may perform motion retargeting to repurpose an existing animation to a different skeleton and/or environment geometry, in accordance with example embodiments of the disclosure.

FIG. 3 illustrates a flow diagram of an example method 300 that may be performed to train a retargeting model that may perform motion retargeting to repurpose an existing animation to a different skeleton and/or different environment geometry, in accordance with example embodiments of the disclosure. The method 300 may be performed by the system 100 as discussed above.

At block 302, the process may receive a target skeleton, an existing animation and an environment geometry data.

At block 304, the process may generate a retargeted animation for the target skeleton based on the existing animation and the target skeleton. Next, at block 306, the process may generate a corrected retargeted animation for the target skeleton by optimizing the retargeted animation for the environment geometry data using physics-based motion optimization.

At block 308, the process may input, to the machine learning retargeting model, the existing animation, the environment geometry data and the target skeleton. The machine learning retargeting model may operate based on the input and, at block 310, the process may include receiving a predicted animation for the target skeleton from the machine learning retargeting model.

The process may then include determining a loss as the delta between the corrected retargeted animation and the predicted animation at block 312. At block 314, the process may include updating the machine learning retargeting model based on the loss (e.g., using backpropagation).

Then, at block 316, the process may determine if additional iterations are to be performed. If so, the process may return to block 302 for the next iteration. Otherwise, the process may stop and/or the machine learning retargeting model may be utilized for normal operations of retargeting existing animations for different skeletons and/or different geometries.

It should be noted that some of the operations of method 300 may be performed out of the order presented, with additional elements, and/or without some elements. Some of the operations of method 300 may further take place substantially concurrently and, therefore, may conclude in an order different from the order of operations shown above. Further, implementations are not limited to the details of the above examples and variations are possible.

Figure 4:
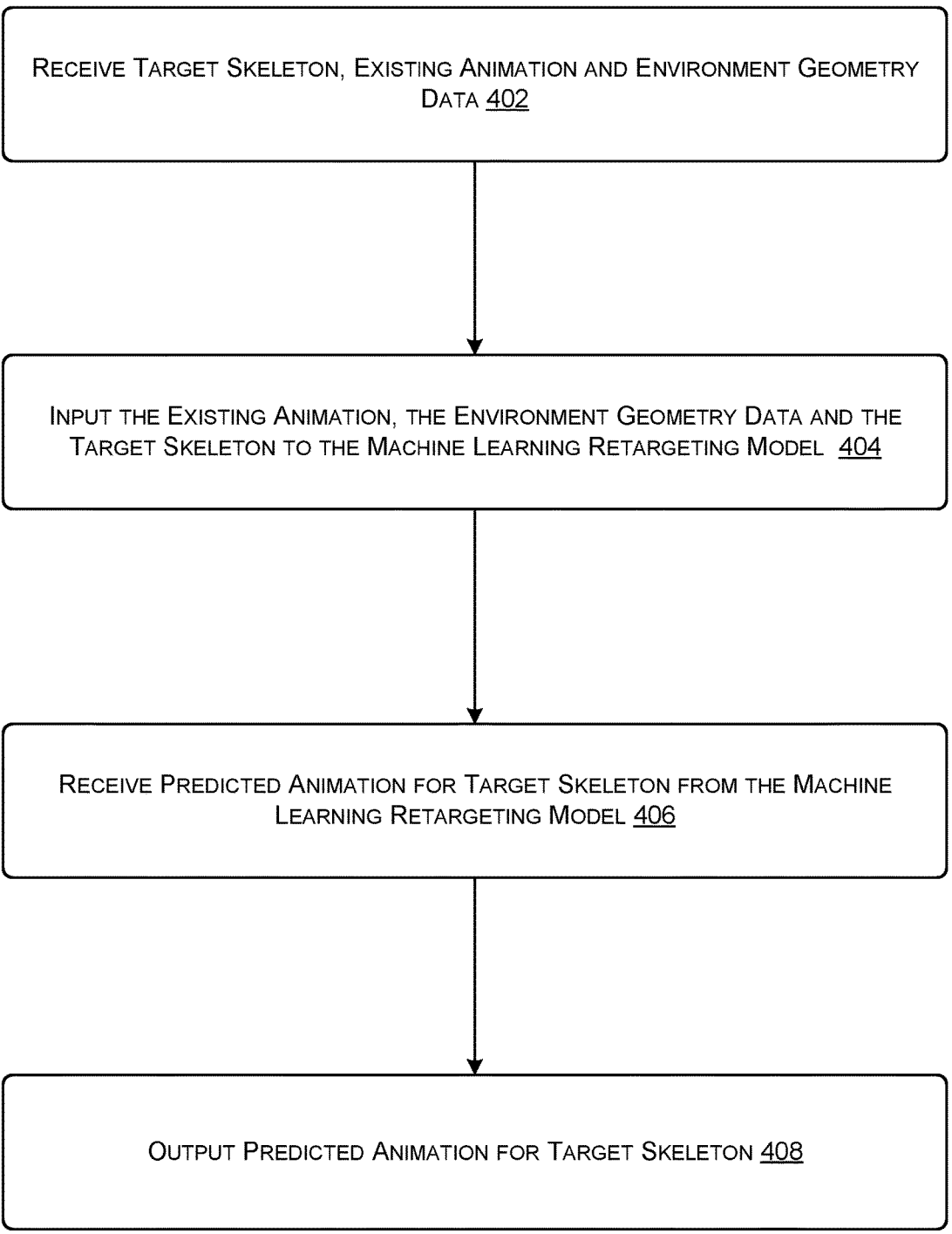
FIG. 4 illustrates a flow diagram of an example method that may be performed to utilize a retargeting model that may perform motion retargeting to repurpose an existing animation to a different skeleton and/or environment geometry, in accordance with example embodiments of the disclosure.

FIG. 4 illustrates a flow diagram of an example method 400 that may be performed to utilize a retargeting model that may perform motion retargeting to repurpose an existing animation to a different skeleton and/or environment geometry, in accordance with example embodiments of the disclosure. The method 400 may be performed by the system 100 as discussed above.

At 402, the process may receive a target skeleton, an existing animation and environment geometry data.

At 404, the process may input, to the retargeting model, the existing animation, the environment geometry data and the target skeleton. The retargeting model may operate based on the input and, at 408, the process may include receiving a predicted animation for the target skeleton from the machine learning retargeting model.

Then, at 410, the process may output predicted animation for target skeleton. In some examples, the predicted animation may be stored to a motion database as an animation for the target skeleton.

Figure 5:
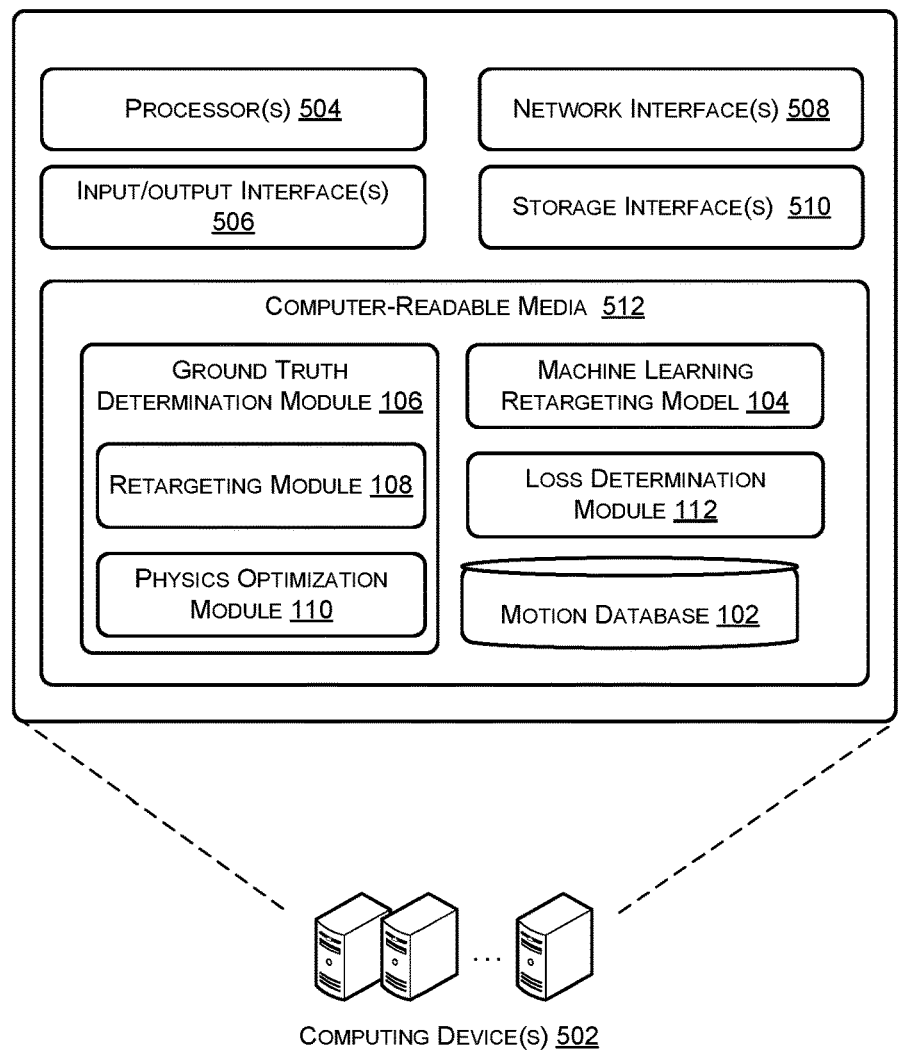
FIG. 5 illustrates a block diagram of an example system including one or more computing device(s) that may train and/or operate a retargeting model that may perform motion retargeting to repurpose an existing animation to a different skeleton and/or environment geometry, in accordance with example embodiments of the disclosure.

FIG. 5 illustrates a block diagram of an example system 500 including one or more computing device(s) 502 that may train and/or operate a retargeting model that may perform motion retargeting to repurpose an existing animation to a different skeleton and/or environment geometry, in accordance with example embodiments of the disclosure. The computing device(s) 502 may include one or more processor(s) 504, one or more input/output (I/O) interface(s) 506, one or more network interface(s) 508, one or more storage interface(s) 510, and computer-readable media 512.

In some implementations, the processors(s) 504 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 504 may possess its own local memory, which also may store program modules, program data, and/or one or more operating system(s). The one or more processor(s) 504 may include one or more cores.

The one or more input/output (I/O) interface(s) 506 may enable a user to interact with a user interface module (e.g., to provide input to and receive output from a user application operating on the system 500). The I/O interface(s) 506 may include a combination of hardware, software, and/or firmware and may include software drivers for enabling the operation of any variety of I/O device(s) integrated on the system 100 or with which the system 100 interacts, such as displays, microphones, speakers, cameras, switches, and any other variety of sensors, or the like.

The network interface(s) 508 may enable the system(s) 100 to communicate via the one or more network(s). The network interface(s) 508 may include a combination of hardware, software, and/or firmware and may include software drivers for enabling any variety of protocol-based communications, and any variety of wireline and/or wireless ports/antennas. For example, the network interface(s) 508 may comprise one or more of a cellular radio, a wireless (e.g., IEEE 802.1x-based) interface, a Bluetooth® interface, and the like. In some embodiments, the network interface(s) 508 may include radio frequency (RF) circuitry that allows the system(s) 100 to transition between various standards. The network interface(s) 508 may further enable the system(s) 100 to communicate over circuit-switch domains and/or packet-switch domains.

The storage interface(s) 510 may enable the processor(s) 504 to interface and exchange data with the computer-readable media 512, as well as any storage device(s) external to the system(s) 100.

The computer-readable media 512 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 512 may be implemented as computer-readable storage media (CRSM), which may be any available physical media accessible by the processor(s) 504 to execute instructions stored on the computer-readable media 512. In one basic implementation, CRSM may include RAM and Flash memory. In other implementations, CRSM may include, but is not limited to, ROM, EEPROM, or any other tangible medium which can be used to store the desired information and which can be accessed by the processor(s) 504. The computer-readable media 512 may have an operating system (OS) and/or a variety of suitable applications stored thereon. The OS, when executed by the processor(s) 504 may enable management of hardware and/or software resources of the system(s) 100.

Several functional blocks having instruction, data stores, and so forth may be stored within the computer-readable media 512 and configured to execute on the processor(s) 504. The computer-readable media 512 may have stored thereon the motion database 102, the machine learning retargeting model 104, the ground truth determination module 106, the retargeting module 108, the physics optimization module 110, and the loss determination module 112. It will be appreciated that each of the functional blocks may have instructions stored thereon that when executed by the processor(s) 504 may enable various functions pertaining to the operations of the system(s) 100.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
one or more processors; and
one or more computer-readable media storing computer-executable instructions that, when executed by the one or more processors, cause the one or more processors to:
input, to a machine learning (ML) retargeting model, an input animation, a target skeleton, and environment geometry data of an environment for a predicted animation, wherein the ML retargeting model is configured to generate the predicted animation based on the input animation, the target skeleton and the environment geometry data of the environment for the predicted animation;
receive, from the ML retargeting model, the predicted animation based on the input animation, the target skeleton and the environment geometry data of the environment for the predicted animation;
generate a retargeted animation, wherein a physics-based motion optimization of the retargeted animation for the environment geometry data of the environment determines a corrected motion of the target skeleton in the retargeted animation that corrects a penetration of an environment geometry associated with the environment geometry data by the target skeleton;
generate multiple candidate action sequences which represent variations on the retargeted animation, wherein each candidate action sequences includes respective joint torques for joints of the target skeleton at each time step;
determine an associated cost for each candidate action sequence based at least in part on the respective joint torques; and determine a selected candidate action sequence of the multiple candidate action sequences based at least in part on the associated cost of the selected candidate action sequence being less than the associated cost of other candidate action sequences.

2. The system of claim 1, wherein the computer-executable instructions further cause the one or more processors to:
determine a ground truth retargeted animation at least in part by performing retargeting of the input animation to the target skeleton;
determine an error between the predicted animation and the ground truth retargeted animation; and
update the ML retargeting model based on the error.

3. The system of claim 2, wherein the performing retargeting of the input animation to the target skeleton generates the retargeted animation and determining the ground truth retargeted animation further includes performing the physics-based motion optimization of the retargeted animation for the environment geometry data of the environment to generate a corrected retargeted animation.

4. The system of claim 2, wherein the ML retargeting model is a neural network and the updating the ML targeting model is performed by backpropagating of the error through the neural network.

5. The system of claim 1, wherein the environment geometry of the environment geometry data differs from a source environment geometry associated with the input animation.

6. The system of claim 1, wherein the target skeleton differs from a source skeleton of the input animation.

7. A computer-implemented method comprising:
inputting, to a machine learning (ML) retargeting model, an input animation, a target skeleton, and environment geometry data of an environment for a predicted animation, wherein the ML retargeting model is configured to generate the predicted animation based on the input animation, the target skeleton and the environment geometry data of the environment for the predicted animation; and
receiving, from the ML retargeting model, the predicted animation based on the input animation, the target skeleton and the environment geometry data of the environment for the predicted animation, wherein an environment geometry associated with the environment geometry data differs from a source environment geometry associated with the input animation;
generating a retargeted animation;
generating multiple candidate action sequences which represent variations on the retargeted animation, wherein each candidate action sequences includes respective joint torques for joints of the target skeleton at each time step;
determining an associated cost for each candidate action sequence based at least in part on the respective joint torques; and
determining a selected candidate action sequence of the multiple candidate action sequences based at least in part on the associated cost of the selected candidate action sequence being less than the associated cost of other candidate action sequences.

8. The computer-implemented method of claim 7, further comprising:
determining a ground truth retargeted animation at least in part by performing retargeting of the input animation to the target skeleton;
determining an error between the predicted animation and the ground truth retargeted animation; and
updating the ML retargeting model based on the error.

9. The computer-implemented method of claim 8, wherein the performing retargeting of the input animation to the target skeleton generates the retargeted animation and determining the ground truth retargeted animation further includes performing a physics-based motion optimization of the retargeted animation for the environment geometry data of the environment to generate a corrected retargeted animation.

10. The computer-implemented method of claim 9, wherein the physics-based motion optimization of the retargeted animation for the environment geometry data of the environment determines a corrected motion of the target skeleton in the retargeted animation that corrects a penetration of the environment geometry by the target skeleton.

11. The computer-implemented method of claim 8, wherein the ML retargeting model is a neural network and the updating the ML targeting model is performed by backpropagating of the error through the neural network.

12. The computer-implemented method of claim 7, wherein the target skeleton differs from a source skeleton of the input animation.

13. One or more non-transitory computer-readable media storing computer-executable instructions that, when executed by one or more processors, cause the one or more processors to perform operations comprising:
inputting, to a machine learning (ML) retargeting model, an input animation, a target skeleton, and environment geometry data of an environment for a predicted animation, wherein the ML retargeting model is configured to generate the predicted animation based on the input animation, the target skeleton and the environment geometry data of the environment for the predicted animation;
receiving, from the ML retargeting model, the predicted animation based on the input animation, the target skeleton and the environment geometry data of the environment for the predicted animation;
generating a retargeted animation, wherein a physics-based motion optimization of the retargeted animation for the environment geometry data of the environment determines a corrected motion of the target skeleton in the retargeted animation that corrects a penetration of an environment geometry associated with the environment geometry data by the target skeleton;
generating multiple candidate action sequences which represent variations on the retargeted animation, wherein each candidate action sequences includes respective joint torques for joints of the target skeleton at each time step;
determining an associated cost for each candidate action sequence based at least in part on the respective joint torques; and
determining a selected candidate action sequence of the multiple candidate action sequences based at least in part on the associated cost of the selected candidate action sequence being less than the associated cost of other candidate action sequences.

14. The one or more non-transitory computer-readable media of claim 13, the operations further comprising:
determining a ground truth retargeted animation at least in part by performing retargeting of the input animation to the target skeleton;
determining an error between the predicted animation and the ground truth retargeted animation; and
updating the ML retargeting model based on the error.

15. The one or more non-transitory computer-readable media of claim 14, wherein the performing retargeting of the input animation to the target skeleton generates the retargeted animation and determining the ground truth retargeted animation further includes performing the physics-based motion optimization of the retargeted animation for the environment geometry data of the environment to generate a corrected retargeted animation.

16. The one or more non-transitory computer-readable media of claim 14, wherein the ML retargeting model is a neural network and the updating the ML targeting model is performed by backpropagating of the error through the neural network.

17. The one or more non-transitory computer-readable media of claim 14, wherein:
- the environment geometry of the environment geometry data differs from a source environment geometry associated with the input animation; and
- the target skeleton is the same as a source skeleton of the input animation.

\* \* \* \* \*